Sept. 18, 1951  C. R. McCAULEY  2,568,348
TELEMETRIC SYSTEM
Filed July 8, 1947  5 Sheets-Sheet 1
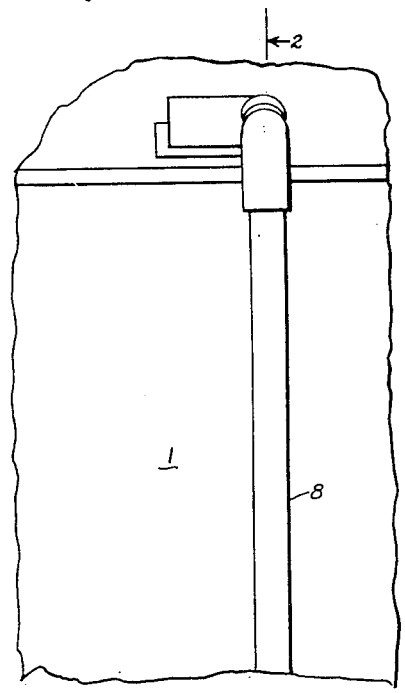
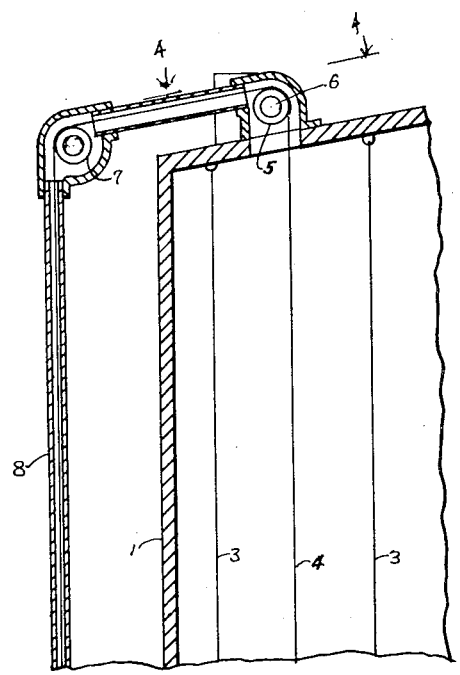
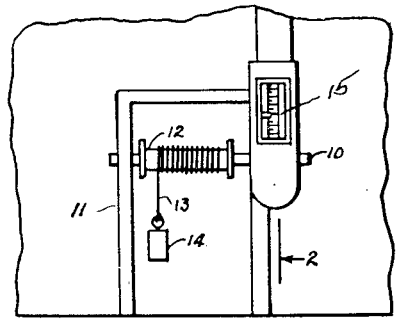
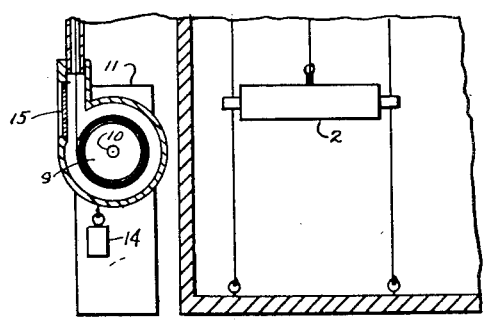
Fig. 1  Fig. 2
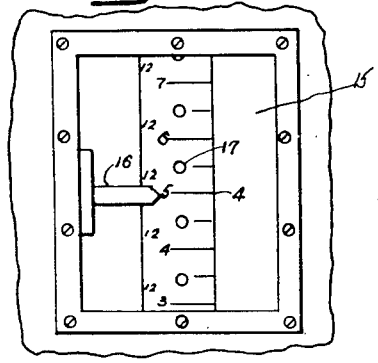
Fig. 3
Inventor
Claudius R. McCauley
By James W. Dent
Attorney Sept. 18, 1951     C. R. McCAULEY     2,568,348
TELEMETRIC SYSTEM Filed July 8, 1947     5 Sheets-Sheet 3

INVENTOR
Claudius R. McCauley
By James W. Nant
attorney

Sept. 18, 1951  C. R. McCAULEY  2,568,348
TELEMETRIC SYSTEM

Filed July 8, 1947  5 Sheets-Sheet 4

INVENTOR
Claudius R. McCauley
BY James W. Dent
ATTORNEY

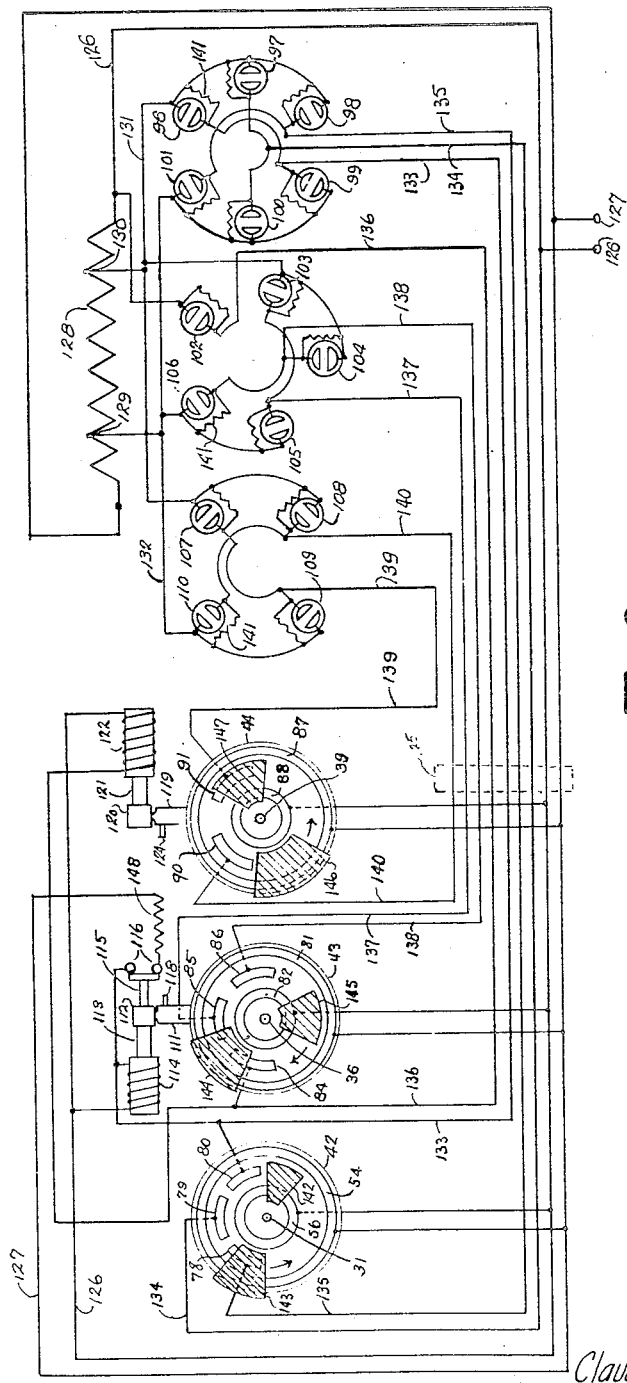

Patented Sept. 18, 1951

2,568,348

UNITED STATES PATENT OFFICE 2,568,348

TELEMETRIC SYSTEM

Claudius R. McCauley, New Orleans, La.

Application July 8, 1947, Serial No. 759,593

8 Claims. (Cl. 177—351)

1

The present invention relates to a system for remote indication of liquid level. Existing practice has required the presence of an attendant at the site of the body or bodies of liquid each time a measurement is to be made. This is a time consuming task and does not provide the information immediately when it is desired. During the filling and emptying operation of tanks, for example, it is necessary to know when the tank is full or empty so that its valves may be closed or opened at the proper time. The present invention provides a system comprising a transmitter located at the liquid container where the depth of the liquid is to be measured, for performing certain predetermined switching operations in accordance with changes of depth of the liquid, and an indicator located at the control center or other remote point to produce an accurate indication of the depth of the liquid in response to such switching operation.

Accordingly, it is an object of the invention to provide a transmitter device operated in response to changes of liquid level, to perform certain predetermined switching operations for energizing related circuits and producing remote indications.

Another object of the invention is to provide a transmitter requiring a minimum number of conductors and other operating parts for a desired number of indications.

Another object of the invention is to provide an electrical means for receiving and indicating the position of a remote body.

Another object of the invention is to provide improved structural and circuit combinations for remote indicating systems.

Other objects of the invention will become apparent from a reading of the specification taken with the disclosure of the accompanying drawings in which:

Fig. 1 is an elevation of a gage for a tank with parts broken away;

Fig. 2 is a fragmentary sectional elevation taken on line 2—2 of Fig. 1;

Fig. 3 is a detail on an enlarged scale of the gage shown in Fig. 1;

Fig. 8 is a circuit diagram of the system.

2

Figure 4:
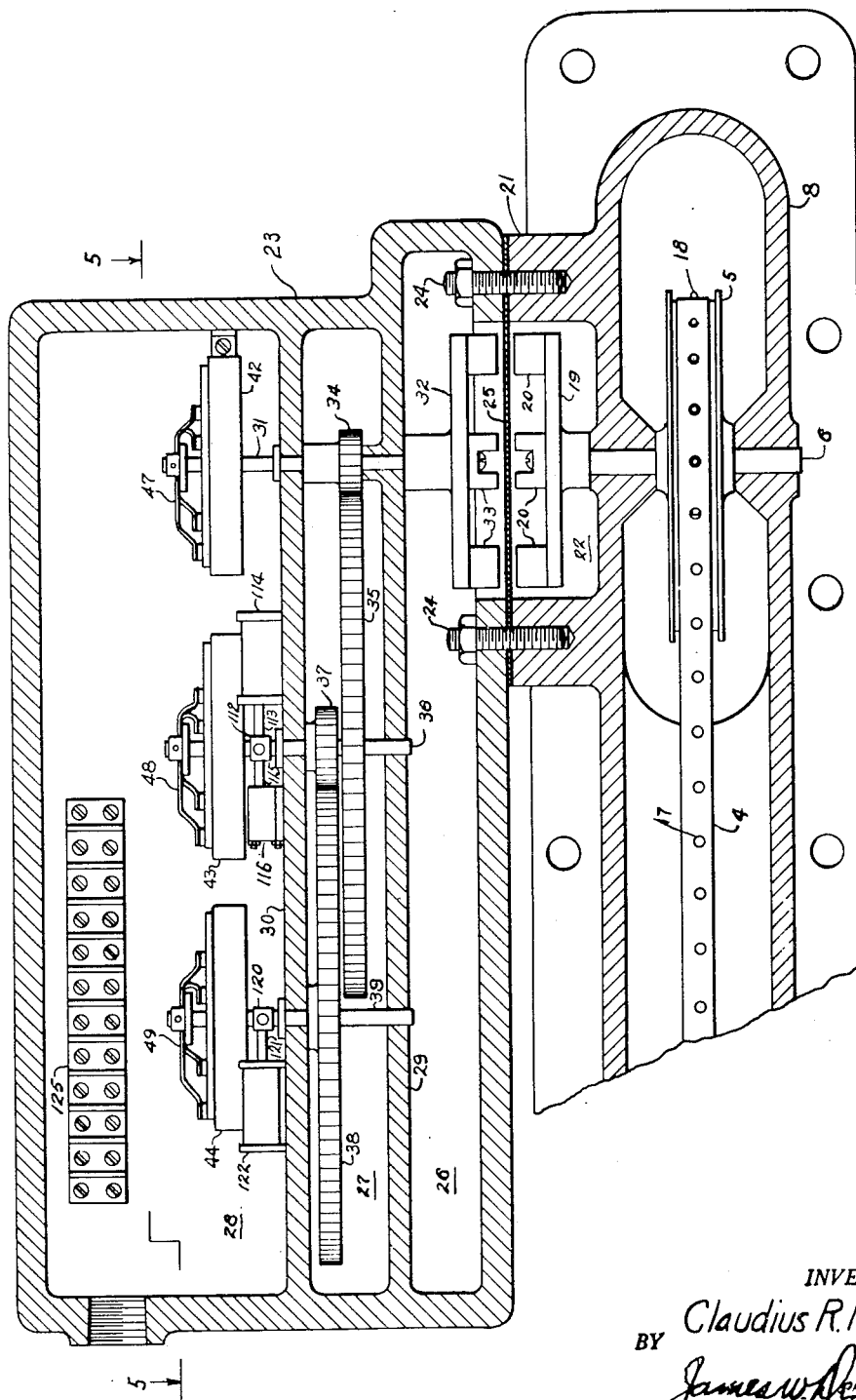
Fig. 4 is a section taken on line 4—4 of Fig. 2 showing the transmitter.

Referring to the drawings, a tank 1 is provided with a float 2, guided by vertical wires 3 anchored to the tank at the top and bottom. The float is connected to one end of a steel tape 4 extending upwardly from the float and passing over a sprocket wheel 5 keyed to a shaft 6, thence over an idler 7 journalled in a housing 8, and down through the housing to a drum 9 upon which the other end of the tape is wound. The drum is mounted upon a shaft 10 journalled in the housing 8, one of its ends extending beyond the housing to a bearing supported by a frame 11. Mounted on the extended portion of the shaft 10 is a drum 12 having wound upon it a cable 13 whose free end supports a weight 14.

The housing 8 containing the sprocket wheel 5, idler 7, drum 9 and a portion of the shaft 10 is suitably sealed to prevent the escape of vapors, which is particularly important where inflammable liquid is contained in the tank.

The purpose of the weight 14 on the cable 13 is to keep the tape 4 taut at all times by providing a torque to the shaft 10 which is transferred to the drum 9 as the tape is moved in either direction due to the rise and fall of the liquid in the tank.

The casing 8 is provided with a window 15 near its base through which the tape may be viewed to give a visual indication of the depth of liquid. As shown in Fig. 3, an index 16 is provided to cooperate with the graduations on the tape 4 to give the depth indication.

The tape 4 is provided with equally spaced perforations 17 which register with pins 18 on the sprocket wheel 5 to drive the latter as the tape move in response to change in liquid level, the resulting motion serving to operate the electrical system by which the measurement of the liquid level in the tank may be transmitted to a remote point.

As shown in Fig. 4, the housing 8 is provided with an external annular boss 21 defining a recess 22, one end of the shaft 6 penetrating the housing and terminating in the recess to support a disc 19 bearing a plurality of permanent magnets 20 of the horseshoe type.

A transmitter casing 23 is attached to the boss 21 by means of bolts 24 to which nuts may be applied through an open portion of the casing, not shown. A non-magnetic diaphragm 25 is interposed between the boss and casing to effectively seal against the escape of any gases into the transmitter casing from the housing.

The casing 23 is divided into three chambers 26, 27 and 28 divided by partition walls 29 and 30.

The chamber 26 contains a magnetic coupling element, chamber 27 houses driving gears, and chamber 28 receives the electrical transmitters.

Carried by the partitions 29 and 30 is a shaft 31 extending into chambers 26 and 28 and through chamber 27. The end of the shaft 31 in chamber 26 bears a disc 32 carrying horse-shoe magnets 33 parallel to the shaft 31 for cooperation with the magnets 20 on the opposite side of the diaphragm 25. Thus any motion of the shaft 6 is transmitted, through the two sets of magnets carried on discs 19 and 32, to the shaft 31. These cooperating discs and magnets constitute a magnetic coupling between the shafts 6 and 31 for the transfer of a limited amount of torque. By proper design the torque limit may be made any value desired to furnish the proper protection to the transmitter. By thus limiting the amount of torque that may be transmitted, the parts of the transmitter may be maintained light in weight, reducing inertia and friction to a minimum, and assuring greater accuracy.

Within the gear chamber 27 is a series of meshed gears to drive the various transmitter switching elements in proper relation to each other. Keyed on shaft 31 is a pinion 34 meshing with a larger gear 35 keyed to a shaft 36. Also keyed to the shaft 36 is a pinion 37 meshing with a larger gear 38 keyed to a shaft 39. The ratio between gears 34 and 35 is one to ten, that is, the pinion 34 will make ten revolutions to one revolution of the gear 35. Similarly, the ratio between gears 37 and 38 is one to eight, whereby the gear 38 will make one revolution while the pinion 37 is making eight revolutions.

The transmitters comprise blocks 42, 43 and 44 centrally perforated to receive the shafts 31, 36 and 39. These blocks 42, 43 and 44 are made of insulating material and each has conducting elements provided on one face thereof, disposed in a manner to be described. Associated with the blocks 42, 43 and 44 and their conducting elements, are contact assemblies 47, 48 and 49 respectively, carried and driven by the shafts 31, 36 and 39 respectively. As the assemblies 47, 48 and 49 are somewhat similar in construction their description will be typified with reference to assembly 47.

Figure 5:
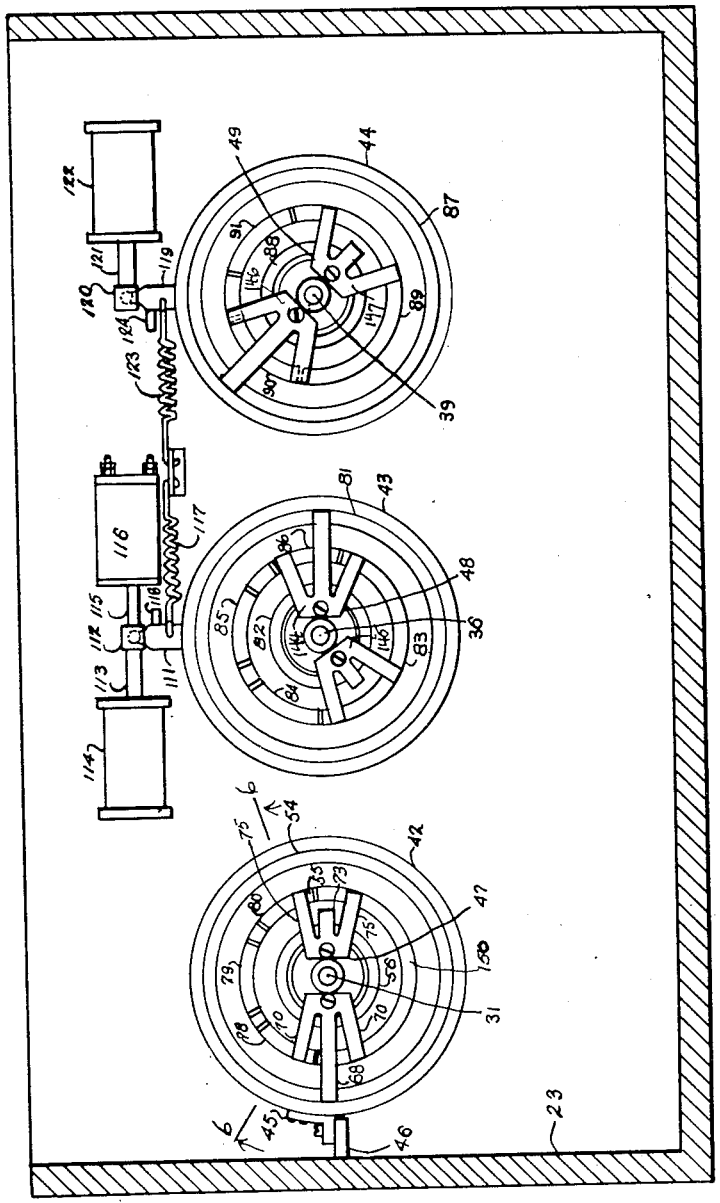
Fig. 5 is an elevation of the transmitter taken on line 5—5 of Fig. 4.
Figure 6:
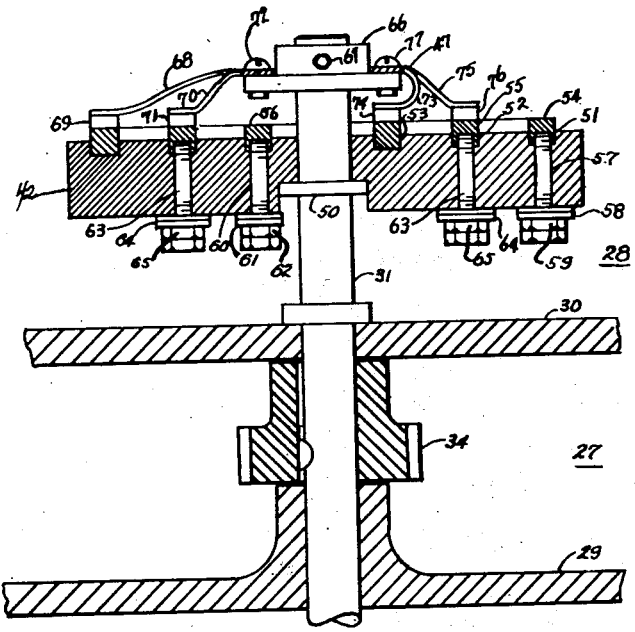
Fig. 6 is a sectional view of one of the transmitters taken on line 6—6 of Fig. 5.

As shown in Figs. 5 and 6 the block 42 is counterbored to receive a supporting collar 50 provided on the shaft 31 and secured against rotation by an angle 45 secured to a projection 46 provided on the casing 23. The block 42 is provided in one of its radial faces with concentric grooves 51, 52 and 53 for the reception of a conducting ring 54, conducting segments 55 and a conducting ring 56 respectively. Ring 54 is provided with a terminal for one side of a current source by means of a conducting bolt 57 passing through the block and fastened thereto by a nut 59 bearing upon washers 58. The ring 56 received in the groove 53 is provided with a terminal for the other side of the current source by a conducting bolt 60 passing therethrough and fastened thereto by a nut 62 bearing upon washers 61.

The intermediate groove 52 is fitted with alternate segments of conducting and non-conducting material designated generally as 55. The conducting segments are secured to the block 42 by means of conducting bolts 63 provided with washers 64 and nuts 65 to define terminals therefor.

The contact assembly 47 is provided with a collar 66 of non-conducting material adjustably fastened to the shaft 31 by means of a set screw 67. This contact assembly comprises two groups of brushes, each group having three blades. The group depicted towards the left in Fig. 5 comprises an elongated blade 68 carrying at its outer end a conducting wiper 69, for engagement with the outer ring 54. The same group includes two similar shorter blades 70 provided with wipers 71 for engaging the intermediate segments 55. This group of brushes is secured to the collar 66 by means of a screw 72.

The second group of brushes comprises a short intermediate blade 73, bent downwardly and under the collar 66, carrying a conducting wiper 74 for engagement with the inner ring 56. Extending at an angle from the blade 73, and on each side thereof, are two similar longer blades 75 carrying conducting wipers 76 for engaging the intermediate segments 55. This group of brushes is also secured to the collar 66 by means of a screw 77.

The minimum span of the outer blades 70 and 75 of the respective brush groups is made equal to one-half the arcuate length of the conducting segments plus one and one-half times the arcuate space between adjacent conducting segments. The brush groups of this contact assembly are angularly displaced by 180° with respect to the collar 66, and when rotated sweep the conducting segments in succession. As the shaft 31 rotates, before one brush group completes its sweep of the segments, the other brush group will have begun its sweep of the conducting segments, the first group then passing to a large non-conducting segment 150 to become ineffective to control the related circuits. As depicted in Fig. 5, each of the conducting segments 78, 79 and 80 together with one of the small insulating segments interposed therebetween, extends through an arc of approximately 60°.

The block 43 is somewhat similar in construction to the block 42, having an outer conducting ring 81 connected to one side of the line and an inner conducting ring 82 connected to the other side of the line. Intermediate these rings a plurality of conducting segments 84, 85 and 86 are received between short insulating segments, each such conducting segment plus one of these insulating segments having an arcuate extent of approximately 72°. A large insulating segment 83 is interposed between the remote conducting segments 84 and 86. The brush groups designated generally as 48, which are of the same general construction as that described in connection with the block 42, are spaced 144° apart, and are carried by the shaft 36 for rotation therewith.

The block 44 has an outer conducting ring 87 and an inner conducting ring 88 which are connected to opposite sides of the line. Intermediate these rings a plurality of conducting segments 90 and 91 each of which together with a short insulating segment interposed therebetween consumes an arc of approximately 90°, and the remainder of this intermediate portion is defined by a long insulating segment 89 interposed between the remote ends of the conducting segments. The brush assembly 49 associated with the block 44 carries two groups of brushes disposed at 180° apart, and are carried by the shaft 39 for rotation therewith. Thus it will be seen that in each of the transmitters the conducting segments of the intermediate rings are contacted alternately singly and in pairs by their respective brush groups.

Figure 7:
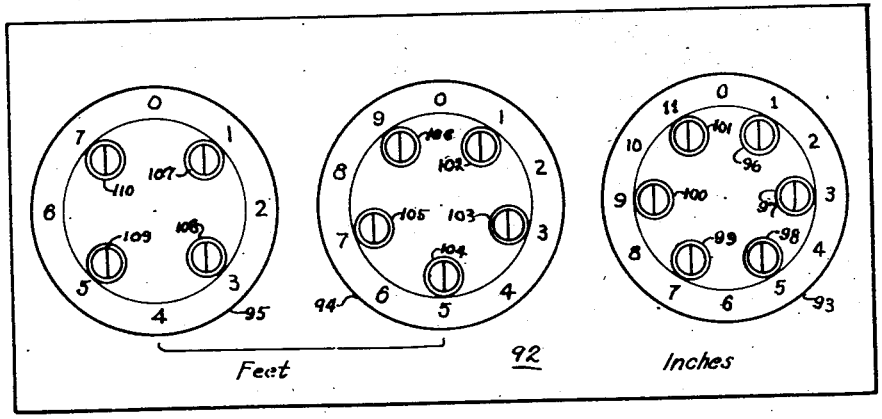
Fig. 7 is an elevational view of the face of the indicator.

The transmitters are used to distribute current to the receiver disclosed in Fig. 7, which shows the face of an indicating instrument 92 having three dials 93, 94 and 95 thereon. The dial 93 is calibrated to indicate depth in inches, while the dials 94 and 95 indicate depth in units and tens of feet respectively. The dial 93 is graduated in twelve parts to indicate depth in increments of one inch, the dial 94 is graduated in ten parts to indicate depth in increments of one foot, and the dial 95 is graduated in eight parts to indicate depth in increments of ten feet. Thus it will be seen that the dials will give a reading in increments of one inch up to a maximum of seventy-nine feet and eleven inches.

The dial 93 has associated therewith six glow lamps 96, 97, 98, 99, 100 and 101 opposite alternate graduations, the lamps being so connected through the transmitter 42 as to be energized when certain conditions exist in a manner to be described. When two adjacent lamps are energized and glow, the calibration between them furnishes the reading, but when only one is lighted the adjacent calibration is read.

The dial 94 has five lamps 102, 103, 104, 105 and 106 of the same character associated therewith which are energized through the transmitter 43. These lamps are arranged to produce readings in the same manner as those described above.

Associated with the dial 95 are four lamps 107, 108, 109 and 110, adapted to be energized through the transmitter 44 and are also read in a similar manner.

The indicator can be designed to indicate smaller or greater depths, and calibrated to read in any desired units, within the scope of this disclosure.

Referring to Fig. 5 a lever 111 is fastened to the back of block 43 and has an end projecting upwardly therefrom pivotally mounted in a block 112 interposed between an armature 113 of an electromagnet 114, and an arm 115 operating a switch 116. A spring 117 is provided to bias the arm 111 against a stop 118 when the electromagnet is de-energized. The electromagnet serves to rotate the block 43 about its axis through an arc of approximately seven degrees upon completion of one of the circuits to be described.

Mounted on the block 44 is an arm 119 extending beyond the edge thereof and pivotally connected to a block 120, which is in turn secured to an armature 121 of an electromagnet 122. A spring 123 is connected to the arm 119 to bias it against a stop 124 when the electromagnet 122 is not energized. Upon energization of the magnet 122, the block 44 is rotated about its axis through an arc of about seven degrees. The normal positions of the blocks 43 and 44 are maintained by the springs 117 and 123 respectively as shown in Fig. 5.

A terminal block 125, Fig. 4, is mounted within the casing 23 for interconnection of the transmitters and receivers through conductors shown in Fig. 8. In this figure, the circuit for operating the remote indicating means is diagrammatically shown. Power for the circuit is derived from suitable line terminals 126 and 127, across which a voltage divider 128 is shown as directly connected. Where alternating current is used this divider may assume the form of a transformer, while various arrangements of resistance may be used if the source is direct current.

Assuming 120 volts to be available at the terminals 126, 127, and that the glow lamps require in excess of 30 volts for their operation, the divider is provided with two intermediate taps 129 and 130 so disposed that the supply of one hundred and twenty volts will produce 60 volts across these taps and 30 volts between each tap and the adjacent end of the divider. Accordingly, there will be a potential difference of 90 volts between each of the taps and the end of the divider remote therefrom.

One terminal of each of the lamps 96, 97 and 98 for the inches dial, lamps 103 and 104 for the unit foot dial, and lamps 107 and 108 for the multiple foot dial is connected by a conductor 131 to the tap 130. One terminal of each of the lamps 99, 100 and 101 for the inches dial, lamps 105 and 106 for the unit foot dial, and lamps 109 and 110 for the multiple foot dial is connected by a conductor 132 to the tap 129. One terminal of the lamp 102 for the unit foot dial is connected directly to the line terminal 126.

With regard to the other terminal of each of these lamps, the connections are as follows: 96 and 99 are connected by a conductor 133 with the segment 80; 97 and 100 are connected by a conductor 134 with the segment 79; 98 and 101 are connected by a conductor 135 with the segment 78; 102 is connected by a conductor 136 with the segment 84; 103 and 105 are connected by a conductor 137 with the segment 85; 104 and 106 are connected by a conductor 138 with the segment 86; 107 and 109 are connected by a conductor 139 with the segment 91; and 108 and 110 are connected by a conductor 140 with the segment 90.

Thus it will be seen that all of the lamps with the exception of lamp 102 are arranged in pairs connected in series between the conductors 131 and 132, which are in turn connected to the taps 130 and 129 respectively of the voltage divider 128. This normally imposes a potential difference of sixty volts across each pair of lamps, or thirty volts across each lamp. Since it has been assumed for purposes of this description that each of the lamps requires the application of more than 30 volts across its terminals to produce a glow, it will follow that the normal 60 volt potential difference across a series pair will be insufficient for their operation. Each lamp is provided with a shunt resistance 141 across its terminals to stabilize the lamp against the effects of stray currents which might produce an incorrect indication.

In operation, assuming the tank 1 to be empty with the float 2 on the bottom and the tape 4 showing zero at the index 16, the brush 143 (diagrammatically depicting the brush group including wiper blades 68 and 70) will contact segment 80 and brush 142 (corresponding to wiper blades 73 and 75) will contact segment 78; brush 144 of the unit foot transmitter will contact segment 84, and brush 145 thereof will contact segment 86; and brush 146 of the multiple foot transmitter will engage segment 91, while brush 147 thereof engages segment 90.

Tracing the circuits under these conditions: current from line terminal 126 flows through tap 130 of the divider 128, lead 131, lamp 96, lead 133, segment 80, brush 143, conducting ring 54 to line terminal 127, thus imposing the required voltage across lamp 96 to cause it to glow; current from line terminal 127 flows through tap 129 of the divider 128, lead 132, lamp 101, lead 135, segment 78, brush 142, conductor ring 56 to line terminal 126, thus imposing the required voltage across lamp 101 to illuminate the same; current from line terminal 126 also flows directly to one terminal of lamp 102, from whose other terminal it is conducted through lead 136, segment 84, brush 144, conducting ring 81 to terminal line 127, causing lamp 102 to glow; current from lead 132 also flows through lamp 106, lead 138, segment 86, brush 145, conducting ring 82 to line terminal 126 to cause lamp 106 to be illuminated; current from lead 131 also flows through lamp 107, lead 139, segment 91, brush 146, conducting ring 87 to line terminal 127, thus imposing the required voltage across lamp 107 to cause it to glow; current from lead 132 also flows through lamp 110, lead 140, segment 90, brush 147, conducting ring 88 to line terminal 126, causing lamp 110 to glow from the imposed voltage. Since two adjacent lamps of each dial have thus been illuminated, the readings will be taken intermediate thereof, which will be in each case zero as will be clear upon reference to the arrangement depicted in Fig. 7.

As liquid is pumped into the tank 1, the float 2 will rise moving the tape 4, whose perforations 17 engage the pins 18 to rotate the sprocket 5, and through the magnetic coupling 20—33, advance the brushes 143 and 142 over the segments 80, 79 and 78. The brush 142 will begin to move off of the segment 78 to extinguish the lamp 101, so that with only the lamp 96 of this dial continuing to glow, an indication of one inch will be read. While brush 143 engages segment 80 only, lamp 96 will be illuminated; when it engages segments 80 and 79, lamps 96 and 97 will glow to give an indication of two inches; when it moves beyond segment 80 and engages segment 79 only, lamp 96 will be extinguished, lamp 97 continuing to glow to indicate depth of three inches; when the brush 143 bridges segments 79 and 78, lamps 97 and 98 will glow to indicate a depth of four inches, whereupon when the brush moves off of segment 79 to engage segment 78 alone, lamp 97 will be extinguished leaving 98 to glow alone for an indication of five inches. Before brush 143 disengages segment 78, brush 142 will make contact with segment 80 to illuminate lamp 99, producing an indication of a six inch depth. Then when the brush 143 passes to the non-conducting portion of the block, the brush 142 will serve to illuminate the lamps 99, 99 and 100, 100, 100 and 101, and 101 to produce indications of seven, eight, nine, ten and eleven inches respectively.

It will be clear from the circuit diagram that a similar sequence of operations of the lamps of the unit foot and multiple foot will occur in a manner conforming with that described with reference to the inches dial.

At this time the gear 34 will have rotated through an arc of 330° and will have driven gear 35 only 33°. As the change from a reading of eleven inches to zero is taking place on the inches dial, the gear 34 will have rotated almost 360° and the gear 35 will have traversed almost 36°, which is not quite enough to extinguish the lamp 106 of the unit foot dial so as to produce a reading of one foot. Since the brush 143 is now contacting the segment 80 to energize the lamp 96, and brush 142 is contacting segment 78 to light the lamp 101, segment 80 also completes the circuit of the electromagnet 114, to attract the armature 113 and actuate the lever 111 against the pressure of the spring 117 to rotate the block 43 approximately 7° in a counterclockwise direction to move the segment 86 from under the brush 145 and extinguish the lamp 106, leaving the lamp 102 illuminated to give an indication of one foot. The electromagnet thus serves to give the proper indication on the unit foot dial prior to the time that the transmitter gear 35 has rotated sufficiently to produce the proper indication.

The terminal of the electromagnet 114 connected to the segment 80 is also connected to the line terminal 127 through the switch 116 and a resistor 148 substantially equal in ohmic resistance to the impedance of the electromagnet 114, so that when the brush 143 breaks contact with the segment 80 and the electromagnet becomes deenergized, there will be no feed-back through the conductor 133 sufficient to cause any of the lamps connected thereto to glow erroneously.

When the brush 143 leaves segment 80, since the switch 116 is open, the electromagnet 114 becomes completely deenergized, the spring 117 returns the armature 113 and the arm 111 to the positions shown in Fig. 5, reclosing the switch 116.

When the indication of unit foot dial 94 is changing from nine to zero, the transmitter gear 35 and its associated pinion 37 will have rotated almost 360°, yet the gear 38 will not have rotated sufficiently to change the reading of the multiple foot dial from zero to one. In order to effect this change at the proper time, the segment 84 is connected to one terminal of the electromagnet 122, whose circuit comprises line 127, ring 81, brush 144, segment 84, winding of magnet 122, and line 126. Energization of electromagnet 122 attracts the armature 121, shifting the arm 119 to move the block 44 through an arc of approximately 7° in a clockwise direction to move the segment 90 from under the brush 147 and thereby extinguish the lamp 110, leaving the lamp 107 illuminated to indicate ten feet.

The reading occurring on the remote indicator 92 with the positions of the brushes shown in Fig. 8, would be fifty-two feet five inches, inasmuch as lamps 109, 102, 103 and 98 would be illuminated under these conditions.

The circuit for lamp 109 includes line 127, tap 129, lead 132, lamp 109, lead 139, segment 91, brush 147, ring 88 and line 126; lamp 102 is illuminated through a circuit including line 126, lamp 102, lead 136, segment 84, brush 144, ring 81 and line 127. The circuit for lamp 103 includes line 126, tap 130, lead 131, lamp 103, lead 137, segment 85, brush 144, ring 81 and line 127. The circuit for lamp 98 includes line 126, tap 130, lead 131, lamp 98, lead 135, segment 78, brush 143, ring 54 and line 127.

Since the lamp 102 is connected directly to the line 126, the other lamps of the unit foot dial 94 being connected in series pairs, the transmitter 43 using three segments makes possible the use of an uneven number of lamps for an indicator, in this case, five. This is an important feature of this invention, accomplished by the spacing of the segments 84, 85 and 86, and the angular relationship between the brushes 144 and 145 previously disclosed. When the brush 144 makes contact with the segment 84, the lamp 102 becomes energized and glows; when the brush shaft 36 has further rotated sufficiently to contact segment 86 to cause lamp 104 to glow, the brush 145 will have moved into contact with the segment 84; however, since the brush 145 and lamp 102 are both connected to the same side of the line, the lamp 102 will not be energized, nor will electromagnet 114 be energized for a similar reason.

The use of glow lamps is advantageous from the standpoint of economy, since even though some of them are always glowing, their power consumption is relatively low.

With this arrangement of three separate dials, ti is possible to secure nine hundred and sixty indications using a maximum of ten transmission conductors between the indicator and the transmitter. This effects a material saving in the initial cost of an installation in that fewer conductors are required to secure the same number of indications than have heretofore been required. Any number of dials may be employed to furnish any desired number of related indications, and the number of indications per dial may also be varied in a manner that will now be clear to those skilled in the art.

The invention has been described in association with a tank for the purpose of indicating depth. It is within the scope of the invention however to apply the principles to systems of many other types, such as those employed for remotely indicating revolutions, directions, pressures, temperatures and the like.

It will be understood that diminishing values, such as liquid depths, will produce a reversal of the direction of rotation of the several brushes and a corresponding descending value on the dials of the remote receivers.

Whereas but one specific application of this invention has been described by way of example, the invention should not be restricted thereto beyond the scope of the appended claims.

I claim:

1. A telemetric system comprising a condition responsive transmitter, a receiver providing a plurality of indicating lamps arranged in a plurality of closed patterns, circuit means connecting terminals of certain of said lamps of each pattern to one terminal of a current source and connecting terminals of others of said lamps of each pattern to another terminal of said source, and a plurality of interconnected selected switching means for said lamp patterns actuated by said transmitter for activating the lamps of said patterns progressively, alternately singly and in adjacent pairs, by completting their circuits to said source.

2. A system as claimed in claim 1 wherein the switching means comprises a stationary disc-like member carrying spaced contacts thereon and brushes rotating relative to the discs and engaging the spaced contacts, and means in the circuit actuated by the brushes at predetermined points in their travel to partially rotate the discs relative to the brushes.

3. A telemetric system comprising a condition responsive transmitter, a receiver providing an even number of indicating lamps substantially uniformly spaced to define a closed pattern circuit means including a voltage divider having intermediate and end terminals, said circuit means connecting a terminal of each of half of said lamps to one of said intermediate terminals, connecting a terminal of each of the others of said lamps to the other intermediate terminal, and connecting the remaining terminals of oppositely disposed lamps together; and switch means actuated by said transmitter for selectively connecting the interconnected terminals of said lamps to a predetermined end terminal of the voltage divider.

4. A telemetric system comprising a condition responsive transmitter incorporating a rotary switch having isolated contacts, a receiver providing a plurality of indicating lamps connected in series pairs and arranged in a closed pattern circuit means including a voltage divider having intermediate and end terminals, said circuit means connecting a terminal of each lamp of a pair to one of said intermediate terminals, connecting a terminal of each other lamp of a pair to the other intermediate terminal, and joining the common connection of each pair with one of said contacts; and a conductor sequentially connecting said contacts from said source, singly and in adjacent pairs to a predetermined end terminal of the voltage divider.

5. A telemetric system comprising a condition responsive transmitter, a receiver providing an even number of indicating lamps arranged in a closed pattern, means connecting terminals of certain of said lamps to one terminal of a current source and connecting terminals of others of said lamps to another terminal of said source, switch means actuated by said transmitter for connecting the remaining terminals of said lamps to said source, alternately singly and in adjacent pairs, and a number of conductors half the number of said lamps interconnecting said circuit means and lamps.

6. A telemetric system comprising a condition responsive transmittter, a receiver providing an odd number of indicating lamps arranged in a closed pattern, means connecting terminals of certain of said lamps to a terminal of a current source and connecting terminals of others of said lamps to another portion of said source, switch means actuated by said transmitter for connecting the remaining terminals of said lamps to said source, alternately singly and in adjacent pairs, and a number of conductors half the number of said lamps plus one interconnecting said circuit means and lamps.

7. A telemetric system comprising a transmitter, a receiver remote from said transmitter providing a plurality of indicating lamps arranged in a closed pattern; circuit means connecting a terminal of each of certain of said lamps to a terminal of a current source, connecting a terminal of each of others of said lamps to another terminal of said source, and connecting the remaining terminals of said lamps to said transmitter; and switch means actuated by said transmitter for connecting said remaining terminals with said source, alternately singly and in adjacent pairs to activate said lamps.

8. A telemetric system comprising a condition responsive transmitter, a receiver providing a plurality of indicating lamps arranged in a closed pattern, circuit means normally connecting series pairs of said lamps to a source of potential insufficient to activate the lamps in series, and switching means actuated by said transmitter for applying an increased potential across said lamps to activate them alternately singly and in adjacent pairs.

CLAUDIUS R. McCAULEY.

REFERENCES CITED

The following references are of record in the file of this patent:

UNITED STATES PATENTS

| Number | Name | Date |
|---|---|---|
| 532,868 | Bull | Jan. 22, 1895 |
| 823,164 | Eble | June 12, 1906 |
| 1,233,522 | Stevens | July 17, 1917 |
| 2,091,303 | Brelsford | Aug. 31, 1937 |
| 2,132,213 | Locke | Oct. 4, 1938 |
| 2,203,766 | Baer et al. | June 11, 1940 |
| 2,207,744 | Larson | July 16, 1940 |
| 2,371,511 | Faus | Mar. 13, 1945 |
| 2,384,766 | Orlich | Sept. 11, 1945 |
| 2,495,416 | McCauley | Jan. 24 1950 |